UNITED STATES PATENT OFFICE.

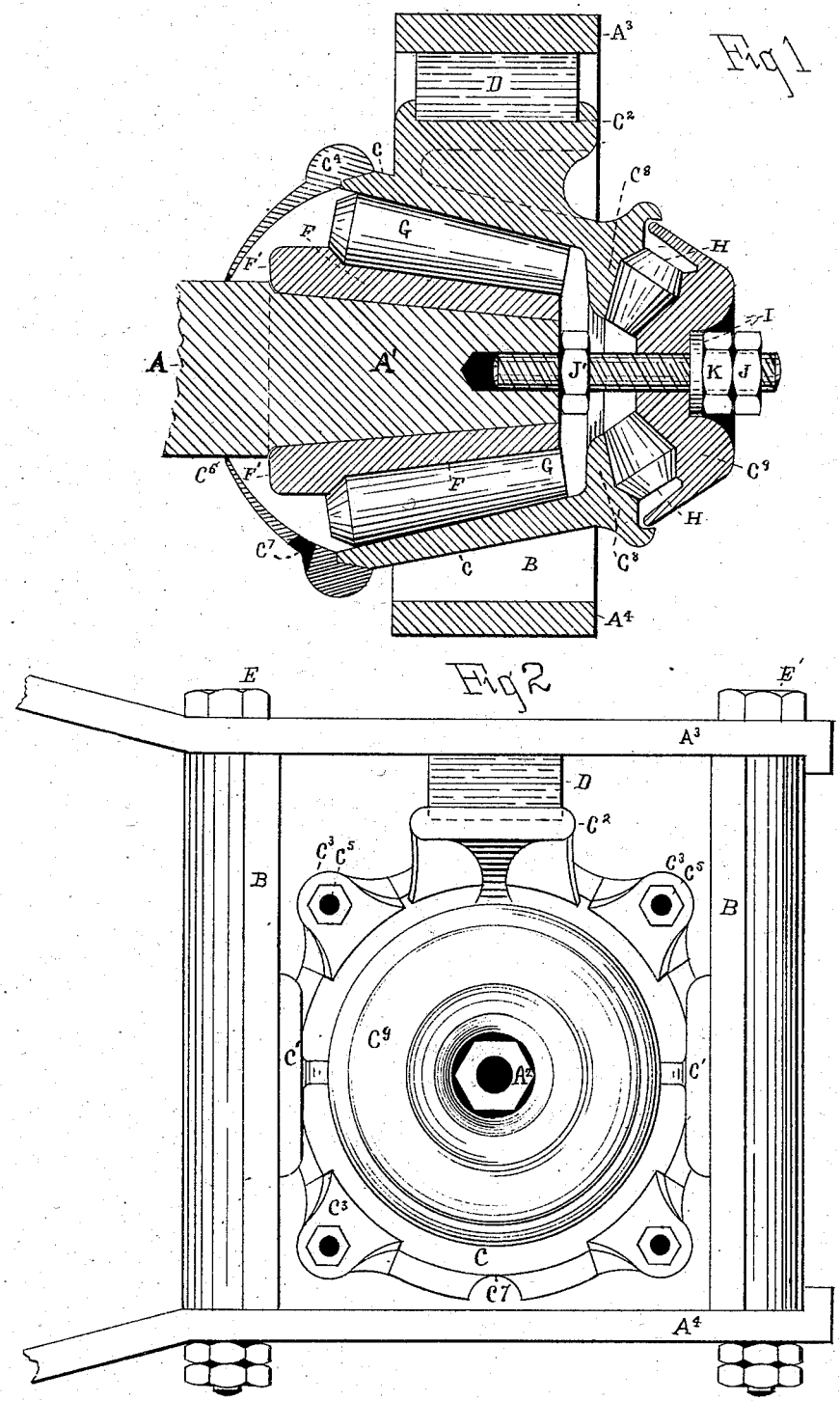

THOMAS F. HEMMICH, OF READING, PENNSYLVANIA, ASSIGNOR OF ONE-HALF TO JOHN G. KALBACH, OF SAME PLACE.

CAR-AXLE BOX.

SPECIFICATION forming part of Letters Patent No. 254,971, dated March 14, 1882.

Application filed January 21, 1882. (No model.)

*To all whom it may concern:*

Be it known that I, THOMAS F. HEMMICH, of the city of Reading, county of Berks, State of Pennsylvania, have invented a new and useful Improvement in Car-Axle Boxes and Bearings therefor, of which the following is a specification.

This improvement relates more particularly to that class of bearings in which anti-friction rollers are employed, and is designed to make the bearing and box independent of support from the pedestal for the retention of the same upon the axle-journal.

Referring to the drawings herewith, Figure 1 is a longitudinal section of the axle, axle-box, bearings, and pedestal; Fig. 2, a front elevation of the bearing-case or axle-box in place in the pedestal.

The following letters in the several figures indicate corresponding parts.

A is the car-wheel axle; A′, a reduced end thereto; $A^2$, a set-bolt tapped into the end of the axle; $A^3$, the top bar, and $A^4$ the lower bar, of the ordinary wrought-iron car-truck frame; B B, the pedestal jaws or horns as ordinarily used on wrought-iron trucks; C, the axle box or case; C′, bracket palms or slides to steady the case between the jaws; $C^2$, a rubber or strong spring-seat at the top of the case; $C^3$, ears on both the case and cap; $C^4$, dust-cap; $C^5$, bolts for connecting the ears of case and cap; $C^6$, opening in the cap for the passage of the axle into the case; $C^7$, dust-hole at the base of the case; $C^8$, a ledge or seat at the apex of the case for the reception of a secondary set of anti-friction rollers; $C^9$, a cap or washer adapted to retain the secondary anti-friction rollers in place; D, a rubber or strong spring placed between the seat $C^2$ and the upper bar of the truck-frame. E E are bolts for securing the jaws B B between the truck-bars. F is a shell, and F′ a head on the shell, which forms the bearing or journal of the car-axle. G G are a series of conical anti friction rollers, placed in the case C and forming the box for the axle. H H is a secondary set of anti-friction rollers, designed to take the end or side thrusts of the axle. I is a washer placed on the bolt $A^2$ and between the cap $C^9$ and the nut K. J J′ are jam-nuts.

By the addition of the secondary or thrust anti-friction rollers H to the front or apex of the axle-box all tendency of the conical rollers G to slide down the inclined bearing F F from the effect of the load and gravitation is counteracted by the pressure of the cap or washer $C^9$, deriving its resistance from the tensional strain of the bolt $A^2$, transferred by the nut K, jam-nut J, and washer I to the cap $C^9$, which pressure, acting through the secondary rollers H upon the ledge or seat $C^8$, presses the box C inward toward the wheel and causes the rollers G to ride up the plane of F until the base of the roller comes in contact with the head F′. An occasional turn of the nut K will take up any wear that may occur and keep the bearing-surfaces in full contact. The bolt $A^2$ may be an extension of the axle A; but I prefer the arrangement of parts as shown in lieu of the jam-nut J′ on the end of the axle. To prevent unscrewing of the bolt on reversing the car movement a hole may be drilled through the axle and bolt and a pin inserted.

The cap $C^9$ may be so bored as to be loose upon the bolt $A^2$; or it may be keyed fast to the same. In the first case it could revolve independently of the axle; in the latter case would revolve with it. I prefer that it should revolve with the axle, and thus keep the end-thrust anti-friction rollers H constantly in motion, which insures their readiness to act whenever a side or end thrust is thrown upon them.

The case C is provided with an internal-coned bed, which I prefer to have cast upon a mandrel, for the purpose of securing a practically indestructible hardened surface upon which the anti-friction rollers G will travel. These, as well as the secondary rollers H, I prefer to have cast in special chills, or made of cast-steel, phosphor-bronze, or an equivalent metal. The cap $C^9$ and the ledge $C^8$ of the case C should in casting be poured upon suitable chills, thus securing a uniform hardness of surface to all the wearing parts.

To secure uniformity of size and hardness the chills and mandrels should be raised to a uniform temperature previous to the introduction of the molten metal, and the metal from the ladle should also be poured at an even rate of temperature for the same pieces. The shell F, with its head F', is also cast within a chill and upon a mandrel, the latter conforming to the reduced portion A' of the axle A.

Where my system of bearings is in use the axles will all be turned down at their ends similar to the form A', the shells F F' being forced thereon. In case of wear the shell F F' is driven off and a new one put on. No wear coming upon the axle, its life is limited only by accident. Great economy therefore is the result of the application of my invention, particularly to new roads, where the rolling-stock would be constructed to adopt my invention. The arrangement of the axle box or case C with vertical and end-thrust bearings of anti-friction rollers G and H, and confining the strains within the box by the cap $C^9$ and box $A^2$, enables me to apply the improvement to any of the modernly-constructed car-truck frames without any change in their construction.

If it is desired to relieve the side-thrust to any extent, gum or other springs may be interposed between special flanges on the box or case C and the inside face of the jaws B; but I do not think it will be found necessary to do so.

Having described my improvement and its mode of construction, together with its application, I desire to secure by Letters Patent the following claims:

1. In an anti-friction car-axle box, as described, the ledge or seat $C^8$, formed at the apex of the shell C as a bed for the rollers H, in combination with the fixed or loose cap $C^9$ and the bolt $A^2$, and nuts J K and washer I, substantially as shown, and for the purpose set forth.

2. In combination with an anti friction-roller axle-box, C, the cap $C^9$, constructed, as shown and described, with a roller-bearing on its inner face, and adapted to be either fixed and revolving with the axle A and bolt $A^2$, or fitted to revolve independently upon the said bolt and in combination with the rollers H, substantially as and for the purpose described.

3. In combination with an anti-friction-roller axle-box, as described, the secondary or thrust anti-friction rollers H, constructed as shown, placed between the seat or ledge $C^8$ and the cap $C^9$, and secured in working-contact therewith by the bolt $A^2$, nuts J K, and washer I, whereby the end-thrust upon the axle is taken up and the bearing made positive upon the journal, substantially as shown, and for the purpose specified.

THOMAS F. HEMMICH.

Witnesses:
JAMES R. KENNEY,
ELWOOD H. DEYSHER.